N. WILLEY.
Evaporating Pan.
No. 68,821. Patented Sept. 10, 1867.
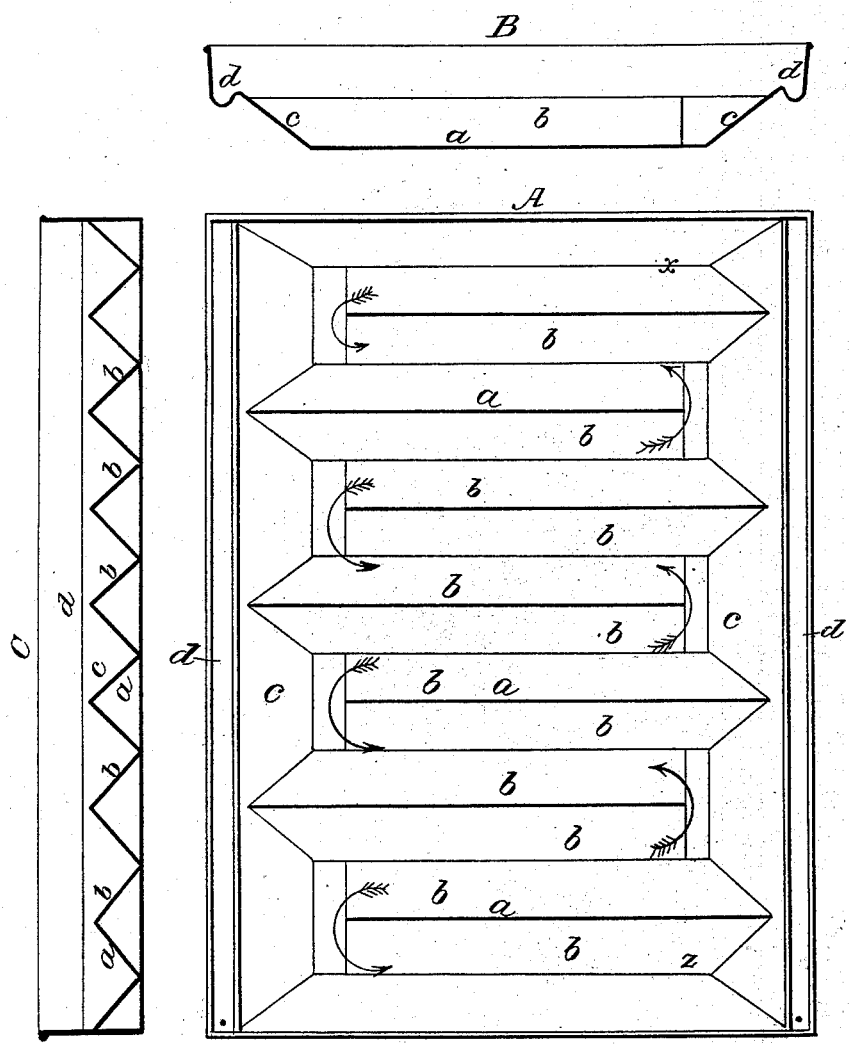
Witnesses:
S. B. Kidder
M. W. Frothingham
Inventor:
N. Willey
by Crosby Halsted & Gould

United States Patent Office.

NATHAN WILLEY, OF SOUTH WINDSOR, CONNECTICUT.

Letters Patent No. 68,821, dated September 10, 1867.

IMPROVEMENT IN EVAPORATING-PANS.

The Schedule referred to in these Letters Patent and making part of the same.

TO ALL WHOM IT MAY CONCERN:

Be it known that I, NATHAN WILLEY, of South Windsor, in the county of Hartford, in the State of Connecticut, have invented an improved Evaporating-Pan; and I do hereby declare that the following, taken in connection with the drawings which accompany and form part of this specification, is a description of my invention sufficient to enable those skilled in the art to practise it.

The invention relates to the construction of evaporating-pans to be used particularly in connection with that class of evaporators employed in treating sorghum, maple sirups, &c.

The improvement consists primarily in so constructing and arranging the bottom of the pan, or that side of the pan against which the heat of the furnace is directed, that it constitutes not only the heat-receiving and imparting surface or surfaces, but also the series of partitions around and against which the sirup flows in passing from the inlet to the outlet end of the pan, or, in other words, such partitions are themselves constituted into the heat-absorbing and radiating surfaces, each lower bend forming two of the partitions.

The drawing represents an evaporating-pan embodying my improvements, A showing a plan, B a transverse section, and C a longitudinal section of the same.

$a$ denotes the bottom of the pan, against the lower surface of which the heat of the furnace directly impinges. $b\ b$, the series of transverse partitions which alternately extend from one side of the pan nearly to the opposite side, or so as to make a continuous passage along which the sirup may flow from one end, $x$, to the opposite one, $z$, as denoted by the arrows at A. Now, as such pans have heretofore been constructed, the bottom is flat, and the partitions are composed of perpendicular walls erected thereon, said walls having no function other than that of making up a continuous passage for the prolonged flow of a divided current of sirup over the heated surface upon which the partitions are erected. In my construction I make the partitions and the bottom in one, by constructing the bottom of the pan of a series of inclines or corrugations, as seen at A and B, carrying each partition thus formed not quite to the side wall, and I thus utilize the surfaces of the partitions as heat-imparting instrumentalities, and greatly increase, in a given space or size of pan, the amount of the radiating surface.

I am aware that the bottom of an evaporating-pan has been corrugated, but I do not think that a series of partitions employed to make a continuous zigzag passage of the sirup has ever been constructed without making some portion of the bottom of the pan flat or horizontal, and arranged so that such partitions themselves will receive all the direct heat from the furnace, and will impart such heat to the current of sirup flowing against their sides, the heat in rising being always concentrated into a diminishing space, and no horizontal surface being exposed to the risk of being burned out more rapidly than the partitions, and so destroying the pan. The scum or extraneous matters thrown up by the ebullition are driven over and settle against these sides, from the surfaces of which they may be readily brushed or scraped up into the troughs, (from which they run into vats or kettles provided for such purpose,) this method of separating such matters from the sirup being much more efficient and less laborious than the common practice of skimming them from the surface into buckets.

It will be obvious that these improvements add greatly to the utility of the pan as an evaporating agent in the treatment of sirups, and do not add materially, if at all, to the cost of construction, but impart strength to the pan, the disposition of the partitions securing them more firmly in place than the vertical partition can be secured under the common form of construction.

I claim an evaporating-pan whose transverse partitions formed from its bottom meet at an angle at their bottom, substantially as described.

I claim, in combination with a bottom so constructed, the inclined sides, as and for the purpose described.

I claim the combination of such a bottom and inclined sides with side troughs, substantially as set forth.

NATHAN WILLEY.

Witnesses:
  FRDK. A. KING.
  CELIA M. KING.